April 21, 1964    H. M. BOND ETAL    3,129,816
PRESSURE-SENSITIVE ADHESIVE TAPE WITH PLASTICIZED
POLYVINYL CHLORIDE BACKING
Original Filed Feb. 7, 1962
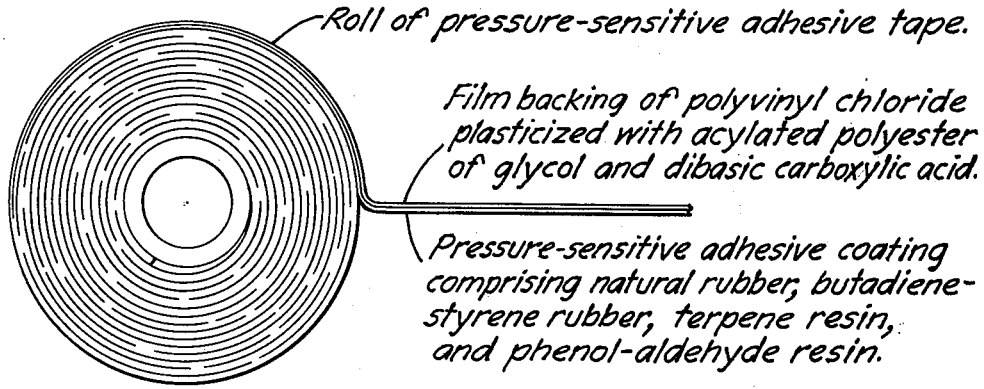
INVENTORS
HERBERT M. BOND
WERTER PIERCE SMITH
BY
Carpenter, Abbott, Coulter & Kinney
ATTORNEYS

United States Patent Office

3,129,816
Patented Apr. 21, 1964

3,129,816
PRESSURE-SENSITIVE ADHESIVE TAPE WITH PLASTICIZED POLYVINYL CHLORIDE BACKING
Herbert M. Bond, Stillwater Township, Washington County, and Werter Pierce Smith, Richfield, Minn., assignors to Minnesota Mining and Manufacturing Company, St. Paul, Minn., a corporation of Delaware
Continuation of application Ser. No. 174,650, Feb. 7, 1962. This application Oct. 31, 1963, Ser. No. 320,279
17 Claims. (Cl. 206—59)

This invention relates to stretchable pressure-sensitive adhesive vinyl tapes and is particularly concerned with highly conformable stretchable and retractable pressure-sensitive adhesive vinyl insulating tape which is capable of being wound upon itself in roll form and of being readily unwound over a wide range of ambient temperatures, including temperatures below freezing, e.g., as low as —20° C. (—4° F.) and well above 50° C. (122° F.), without breaking and without splitting or offsetting of the adhesive. The tape may then be wrapped around splices and wires and has sufficient elasticity, retractility and adhesion at such temperatures to remain tightly and snugly in place, while providing effective electrical insulation of the splices and wires over at least the range of —20° C. to 87° C. (—4° F. to 189° F.).

Unvulcanized rubber base electricians' tape and friction tape have been largely superseded in electrical insulation wrappings by vinyl insulating tapes, i.e., pressure-sensitive adhesive tapes having backing films of plasticized vinyl chloride homopolymers and copolymers; see Oace et al. Reissue Patent No. 23,843, granted June 29, 1954, and based upon original Patent No. 2,559,990, granted July 10, 1951, on an application filed January 12, 1946. At temperatures of usage which were most common or normal heretofore, e.g. 50° to 100° F., such vinyl insulating tapes, heretofore known, have a nice balance of flexibility, stretchiness and retractility so that they may be wrapped snugly around irregular surfaces such as wire splices to provide good electrical insulation which exhibits excellent resistance to weathering and to chemical attack. However, plasticized vinyl insulating tapes commercially available prior to this invention were found to become brittle or to lose tackiness or to delaminate at sub-freezing temperatures, and most of these tapes could not even be unwound from roll form at such temperatures without breaking. Thus, the industry was obliged to caution the user not to expose prior art vinyl insulating tape to sub-freezing temperatures during use except for brief periods. Even after application, tapes which were brittle at low temperatures cracked when stressed while cold.

In spite of the need for all-weather insulating tape, the attitude of the industry was that any vinyl insulating tape which might work satisfactorily at sub-freezing temperatures would necessarily have inferior properties at higher temperatures. For example, low molecular weight plasticizers would be expected to provide superior low-temperature flexibility, but would also be expected to volatilize at high temperatures so that the backing would be embrittled, and at normal room temperatures would be expected to cause the adhesive to become soft and pasty.

Although a pressure-sensitive, stretchable and retractable vinyl plastic insulating tape, as described in the Oace et al. Reissue Patent No. 23,843, was made, sold and widely used since beginning in the year 1945, and although the need for an all-weather insulating tape existed all the while, the need went unserved for more than a decade, until the tape of the present invention was first made available commercially.

We have discovered that it is possible for a plasticized vinyl insulating tape to have the long-sought combination of full utility at sub-freezing temperatures without sacrifice in quality, either in handling or in insulating properties, at higher temperatures. This surprising achievement of unique and valuable properties is attained in the novel insulating tape of our invention by a special combination of plasticized vinyl film backing and pressure-sensitive adhesive coating. The vinyl film backing incorporates a highly efficient, but substantially non-volatile plasticizing material which is highly compatible with the vinyl polymer and which we have found may be used in extraordinarily large amounts (up to about 75 parts per 100 parts of said polymer) to provide plasticized film backings which are more supple and stretchy as well as more quickly retractable at any ambient temperature than are the plasticized vinyl film backings of adhesive tapes of the prior art at the same caliper thickness. Exemplary of suitable plasticizing material is a polyester having a number average molecular weight of about 500 to 3500 as determined by the vapor pressure method as described in Analytica Chimica Acta, vol. 20, page 519 (1959), although where the number average molecular weight is below 750, the plasticizing material should be substantially free from molecules below about 500 molecular weight.

If used as the sole plasticizer, the polyester should have a number average molecular weight preferably within the range of about 750 to about 2000 or 2500, with about 1500 or so normally being the preferred top.

The ester groups of the polyester are connected by hydrocarbon chains including an average of about 4 to 8 carbon atoms and are terminated by acyl chains containing about 2 to 18 carbon atoms, the average number of carbon atoms in individual connecting and terminating chains being 5 to 9. However, plasticizing material of other chemical composition is also useful, so long as it provides in the plasticized film backing at —20° C. a modulus at 50% elongation of less than 5300 p.s.i. The plasticizing material should also provide a plasticized film backing, the brittleness of which at —20° C. is not more than twice that at 0° C. The brittleness is defined as the modulus at break divided by the elongation at break. To attain such performance, the plasticizing material should be used in an amount of about 45 or more parts per 100 parts of vinyl polymer, and normally preferably within the range of about 55 to 65 parts per 100 parts of said polymer. Furthermore, the plasticizing material should be of such character that the weight loss of the plasticized film in activated charcoal after 24 hours at 113° C. does not exceed about 10% (ASTM Method D 1203–52T).

With the use of plasticizing material of such efficiency and in such large amounts, the ordinary man skilled in the art at the date of our invention would have expected that in any pressure-sensitive adhesive tape made with this plasticized vinyl film backing, the adhesive coating would soften and fail cohesively. However, we have found that by so selecting the adhesive that a coating thereof on an inert film backing is very firm, e.g. firm to the point that the viscosity of the adhesive is about two million poises or more, and also so that the combined rubbery and resinous ingredients of the adhesive have a low cohesive energy density, the softening effect of the plasticizing material on the adhesive coating is adequately minimized or overcome. To this end, the rubbery and resinous ingredients of the adhesive preferably have a combined cohesive energy density of less than about 75 calories per cubic centimeter.

The combined cohesive energy density of the rubbery and resinous ingredients may be obtained from published values for the separate ingredients, e.g. see H. Mark and A. Tobolsky, Physical Chemistry of High Polymeric Systems, vol. II (2nd ed., 1947), Interscience Publishers Inc., pages 260–267, except that published values vary according to the method of determination. However, a precise value for each ingredient of any pressure-sensitive adhesive may be calculated using the Molar-Attraction Constants at 25° C. listed in a table at page 733 of Official Digest, October 1955, following instructions in the article in which this table appears. These calculated values for cohesive energy density, whether or not they accord with published values or laboratory determinations, may be relied on for the purposes of this invention.

A general class of polyesters generic to some plasticizers employed in our novel tape product is disclosed in Griffith et al. Patent No. 2,617,779 and is said to provide low temperature flexibility in vinyl halide resin while possessing low volatility at elevated temperatures. However, the polyester of the single working example of the patent does not provide a vinyl resin film backing suitable in the practice of our invention, and there is no disclosure in the patent of any stretchable and retractable vinyl plastic pressure-sensitive adhesive tape, nor any suggestion that any plasticized vinyl film therein described might have utility as pressure-sensitive adhesive tape backing.

Others have also suggested the use of vinyl resin plasticizers of the same general class of polyesters as in the Griffith et al. patent, e.g. Wilkinson et al. Patent No. 2,815,354 and an article by Koroly et al., "Polymeric Plasticizers," Industrial and Engineering Chemistry, May 1953, pages 1060–1063. However, neither of these ever suggests that vinyl films so plasticized have particularly advantageous rheological properties at low temperatures for any purpose, and neither discloses pressure-sensitive adhesive tapes of any type.

Even though plasticizers were known which would lend cold-weather flexibility to vinyl polymer film, and pressure-sensitive adhesive compositions were known which when coated on various other backings produced tapes that were useful at very cold temperatures, a suitable combination of plasticized vinyl backing and pressure-sensitive adhesive coating for all-weather use was not known prior to this invention. Neither were the properties resulting from the combination of the vinyl resin, the particular plasticizer and the particular adhesive of our tape product obvious from consideration of these ingredients themselves. By way of illustration, in many constructions of our novel insulating tape, the adhesive coating is even tackier at around freezing temperature (0° C.) than it is at normal room temperature. This is in contrast to coatings of the same adhesive on inert backings such as cellophane, which are virtually tack-free at sub-freezing temperatures and much less tacky at 0° C. than at room temperature.

The immediate commercial success of our novel vinyl insulating tape cannot be solely attributed to its low-temperature performance, for it soon was in large demand in areas where sub-freezing temperatures are seldom encountered. As compared to prior art vinyl tapes of the same caliper thickness, e.g. 8 mils, even at the moderate temperatures where they could be used, the novel vinyl insulating tape of our invention is more supple and stretchy as well as more quickly retractable and is especially useful for taping small wires. It provides tighter, more oil and moisture resistant electrical splices. It also has particularly good resistance to puncture at temperatures close to the boiling point of water and excellent electrical insulating properties both at ordinary and at very high operating temperatures.

Even where a vinyl insulating tape with the wide temperature working range of our preferred all-weather tape is not required, and where a temperature working range of the order illustrated in Oace et al. Re. 23,843 is sufficient, an aspect of our present invention nonetheless provides a novel tape having a plasticizer majorly or entirely composed of a special all-liquid or all low molecular weight plasticizer, and possessing advantageous characteristics and economies in processing. Such tape may or may not have the wide temperature working range of an all-weather tape, depending upon the particular formulation, as hereafter illustrated and described: e.g. see the illustration in Example 6.

A preferred film backing of the novel insulating tape of our invention consists essentially of a stable blend of (a) 100 parts by weight of a film-forming polymer of monomer comprising at least about 90% vinyl chloride and (b) about 45–75 parts of plasticizer, the primary constituent of which is an acylated polyester of glycol and saturated aliphatic dibasic acid, the skeletal backbone of which consists of ester groups connected by alkylene chains including an average of about 4 to 7 carbon atoms (counting branch carbons) and is terminated by acyl chains (the hydrocarbon chain portions of the acyl radical) containing 2 to 18 carbon atoms and on the average at least 8 carbon atoms. Occasional atoms such as ether oxygens in the skeletal backbone may be disregarded in counting the carbon atoms. Preferably the ester-connecting chains and the terminating chains considered together should average about 5 to 9 carbon atoms. Vinyl film plasticized with an acylated polyester having a smaller average number of carbons in the connecting and terminating hydrocarbon chains tends to lack adequate flexibility at sub-freezing temperatures. In any event, the connecting and terminating hydrocarbon chains should have sufficient average length to provide in the plasticized vinyl film a modulus at 50% elongation of less than 5300 p.s.i. when a 0.5-inch wide film is tested at —20° C. on the Instron Tensile Tester at an initial jaw separation of one inch and at a rate of 12 inches per minute. In other words, a tension of 5300 pounds per square inch based on the initial dimensions should be sufficient to elongate the film at least 50% at this temperature. Preferably the plasticized vinyl film should elongate at least 100% or 125% before breaking in this test.

An exemplary acylated polyester may be prepared from at least one of the group of saturated aliphatic dibasic acids having alkylene chains including 3 to 8 carbon atoms and a glycol selected from at least one of 1,2-propylene glycol, 1,4-butane diol and 1,6-hexane diol, but preferably with not more than 65 mol percent of the glycol being 1,2-propylene glycol. Up to about 10 mole percent of the dibasic carboxylic acid content of the acylated polyester may be aromatic, unsaturated aliphatic or cycloaliphatic.

Preferably the polyester plasticizer has a number average molecular weight of 750 or 1000 or more, as determined by the vapor pressure method. At much below 750, unless the total plasticizing material in the vinyl backing is substantially free from components having a molecular weight below 500, the plasticizer tends to migrate excessively into the pressure-sensitive adhesive coating to an extent that the adhesive becomes soft and pasty. Moreover, volatility at elevated temperatures may be excessive. On the other hand, if the polyester is considerably higher in number average molecular weight than 3500, the plasticized vinyl backing tends to be somewhat inflexible and brittle, and difficulty may be encountered in unwinding rolls of the pressure-sensitive adhesive tape at very cold temperatures. Optimum all-weather flexibility is attained if the number average molecular weight of the total plasticizer is not more than 2500, and ordinarily not more than 2000. Whatever the number average molecular weight of the total plasticizer in the film backing of our novel vinyl insulating tape, it should be possible to extract a cut of at least a sub stantial amount, e.g., 6–10% or more by weight, of the plasticizer having a number average molecular weight of about 1000 or less.

It is preferred, for optimum electrical insulating properties and for stability under conditions of high temperature and humidity, that the acid number of the total plasticizer of the film backing not exceed about 8, and it is better if the acid number is less than 3.

The film backing should contain at least about 45 parts of plasticizer per 100 parts of vinyl polymer if it is to have good flexibility and elasticity at sub-freezing temperatures and should contain at least 55 parts of plasticizer where the polyester is at the higher end of the acceptable range of molecular weight. At much above 75 parts plasticizer, compatability problems may be encountered, and the film backing tends to be deficient in a number of respects, e.g. strength and stability at high temperatures, resistance to solvent attack.

The vinyl polymer of the film backing preferably includes about 3–5% vinyl acetate copolymerized with 97–95% vinyl chloride. The homopolymer of vinyl chloride provides essentially equal tape products in the practice of this invention but is more difficult to process and absorbs the polyester plasticizer less readily. On the other hand, copolymers of more than about 10% vinyl acetate or other copolymerizable monomer (e.g. substantially more than the approximately 10% vinyl acetate employed in the commercially available "Vinylite VYNS" polymer of vinyl chloride) have lower softening points and provide tapes of less resistance to heat.

The preferred thickness of the backing film is 0.003 to 0.020 inch (3 to 20 mils). A thickness of about 5 to 10 mils is generally most useful.

With the ingredients of the film backing of the novel pressure-sensitive adhesive insulating tape carefully controlled to assure flexibility and elasticity at sub-freezing temperatures without depreciation of other qualities, the rubber resin adhesive must also be selected with care. First, as noted hereinabove, the combined rubbery and resinous ingredients of the adhesive, to be sufficiently resistant to softening by the plasticizing material, should have a low cohesive energy density (i.e. preferably less than 75 calories per cubic centimeter) and the adhesive should be a firm-type (i.e. the viscosity of a coating thereof on an inert backing is preferably about two million poises or more). While many such firm-type adhesives are aggressively tacky, some such adhesives may be so firm that they seem virtually nontacky to the touch. However, when the adhesive is coated on a plasticized vinyl film backing as described above, and when permanent equilibrium is attained between the backing film and the adhesive, the adhesive coating is found to be aggressively tacky due to some influence thereon by the plasticized vinyl backing (the viscosity then may have been reduced below a million poises).

Since most rubber resin pressure-sensitive adhesives are not firm-type adhesives, it is usually necessary to reinforce them, e.g., by heat-reaction with up to about 25 parts of a compatible, oil-soluble, heat-reactive phenol-formaldehyde resin. Alternatively, the cohesive strength may be built up through the use of reinforcing fillers or by vulcanization, but it is preferred that the adhesive composition be sulfur-free to avoid corrosion. The same result may sometimes be achieved by using a rubber latex in making up the pressure-sensitive adhesive composition to avoid milling the rubber. Another method is by electron radiation, by procedures which avoid degradation of the vinyl resin film.

A convenient method of determining the viscosity of a rubber resin adhesive in dried coating form is as follows: The adhesive is coated from solution onto a nonstretchable inert film backing, which is free from plasticizer or other material which might affect the adhesive, and dried to provide a coating of any thickness, but preferably of a thickness of about 0.8 to 1.6 mils (which is a preferred range of adhesive thickness in the tapes of our invention). A 0.25-inch wide strip of tape is wrapped 360° around a freely rotatable stainless steel rod of 0.238 cm. radius with one end of the tape extending to a stationary clamp. A constant torque is applied to rotate the rod to apply a shear stress over the full wrap, and the rotational velocity is measured. The test is repeated at several constant torques, and a plot is made of torque vs. velocity from which the angular velocity is taken at a shear rate of 1 sec.$^{-1}$. The viscosity $\eta$ at that shear rate is calculated using the equation $$\eta = 6.3 \times 10^7 \frac{Tt}{\omega}$$

where T is the torque in gram-centimeters, $t$ is the thickness of the adhesive in centimeters, and $\omega$ is the velocity in degrees per minute.

A rubber resin adhesive coating which is particularly preferred in the practice of this invention comprises a homogeneous blend of (a) 40–60 parts of natural rubber, (b) correspondingly 60–40 parts of butadiene-styrene synthetic rubber, (c) 60–150, or preferably 80–115, parts of a pure-hydrocarbon thermoplastic terpene tackifier resin having low acid number and a melting point of at least 60° C., and (d) 3–16 parts of a compatible, oil-soluble, heat-reactive phenol-aldehyde resin.

About 90–100 parts of the terpene resin provide an optimum degree of tackiness. Especially good results have been achieved with terpene resins having melting points of 85° C. and 115° C. Higher and lower melting resins are also suitable. Exemplary is a terpene resin melting at 60° C. which is commercially available under the trade designation "Piccolite S–60."

The adhesive composition preferably includes a promotor such as zinc oxide, a rubber antioxidant, and may also incorporate small proportions of other tackifier resins, plasticizers or reinforcing fillers such as carbon black, calcium carbonate, clay, silica, etc. The presence of these or other modifiers can have some effect on the proportion of terpene resin, as will be appreciated by those skilled in the pressure-sensitive adhesive art.

To increase the anchorage of the adhesive coating when the tape is unwound from roll form, the face of the film backing to which the adhesive coating is applied should first be provided with a primer coating.

The accompanying illustration shows a roll of a preferred pressure-sensitive adhesive tape of our invention wound directly upon itself. The backing of the tape is a film of polyvinyl chloride plasticized with acylated polyester of glycol and dibasic carboxylic acid. The tape has a normally tacky and pressure-sensitive adhesive coating comprising natural rubber, butadiene-styrene synthetic rubber, terpene resin and phenol-aldehyde resin blended together in proportions as described hereinabove.

POLYESTER A

| | Mols |
|---|---|
| Adipic acid | 2.12 |
| 1,2-propylene glycol | 1.10 |
| 1,4-butane diol | 1.52 |
| Lauric acid | 1.00 |
| Acetic anhydride | 0.50 |

The above materials, except the acetic anhydride, were heated in a kettle under a blanket of nitrogen at 220° C. for 2–3 hours, during which time part of the water of condensation and 1,2-propylene glycol were continuously returned to the kettle. The water of condensation was then distilled off with continued heating at 200° C. for an additional 8–10 hours, after which the pressure was reduced to 10 mm. of mercury for about one hour until the acid number dropped below 5. The vacuum was then removed, the temperature lowered to 160° C., and the acetic anhydride added. The temperature again was brought to 200° C. for one hour under a blanket of nitrogen, after which the pressure was reduced to 10 mm. and held for an additional hour until the acid number reached about 2 to 3. The number average molecular weight was about 1225 as determined by the vapor pressure method referred to above.

POLYESTER B

| | Mols |
|---|---|
| Adipic acid | 2.34 |
| Isophthalic acid | 0.75 |
| 1,2-propylene glycol | 2.01 |
| 1,4-butane diol | 1.67 |
| Lauric acid | 1.00 |
| Acetic anhydride | 0.50 |

This polyester was prepared in the same way as Polyester A to an acid number of about 5. Its number average molecular weight was about 1200 as determined by the vapor pressure method.

Example 1

| | Parts by weight |
|---|---|
| Copolymer of 97 parts vinyl chloride and 3 parts vinyl acetate ("VYNW") | 100 |
| Polyester A | 60 |
| Epoxidized soybean oil as stabilizer ("Ferro 900") | 1 |
| Organic inhibitor ("Ferro 903") | 1 |
| Coprecipitated barium/cadmium soap of lauric acid ("Ferro 1820") | 1 |
| Carbon black | 1.5 |
| Stearic acid | 0.5 |

The above materials were mixed for 30 minutes in a Sprout-Waldron ribbon blender. The mixture was then fused in a Banbury mixer, held until a temperature of 150° C. was attained, and then fed into a four-roll, inverted-L calender with rolls maintained at 150° C., to calender it into a film.

When this plasticized vinyl film at a thickness of 7.5 mils was tested at −20° C. on the Instron Tensile Tester at a rate of 12 inches per minute, its modulus at 50% elongation was 3910 pounds per square inch. Elongation at break at −20° C. was 240%. The brittleness at −20° C. (modulus at break divided by elongation at break) was 1.65 times the brittleness at 0° C. Weight loss after 24 hours at 113° C. in activated charcoal was only 2.7%.

A 6-mil film of the same plasticized vinyl resin was first primed with a thin uniform coating of synthetic rubber resin primer composition applied from solution in toluene and methyl ethyl ketone. Substantially 50% of the primer composition was rubbery butadiene-acrylonitrile copolymer. Almost 25% consisted of glycerol ester of gasoline-insoluble resinous extract of pine wood. About the same amount of para-tertiary-butyl-phenol formaldehyde resin was also present. The balance was essentially zinc oxide and salicylic acid. The ratio of the rubber, tackifier and phenolic resin in this primer composition is not critical. For example, about 80 parts of the rubbery copolymer mixed with 10 parts of each of the tackifier and phenolic resin provide essentially equivalent results.

Over the primer, the following adhesive composition was knife-coated to a dry coating thickness of 1.0 mil and the tape produce was slit to a ¾-inch width and wound upon itself in roll form.

ADHESIVE FORMULATION

| | Parts by weight |
|---|---|
| Crude smoked sheet | 50 |
| Rubbery butadiene-styrene copolymer (GRS–1004) | 50 |
| Polymerized terpene resin ("Piccolite S–115") | 90 |
| Phenol-aldehyde resin ("Bakelite–14634") | 12 |
| Zinc oxide | 10 |
| Di-tert-amyl hydroquinone ("Santovar A") | 2 |
| Carbon black | 10 |
| Calcium carbonate | 50 |
| Hexane | 500 |

The "Bakelite BR–14634" used in the adhesive is understood to be a para-tertiary-butyl-phenol formaldehyde resin made with an alkaline catalyst and with more than one mol, i.e. between 1.5 and 2.0 mols, of formaldehyde for each mol of substituted phenol. The same phenol-formaldehyde resin is now marketed as "Bakelite CKR–1634." "Piccolite S–115" is a polymerized beta-pinene resin having a melting point of 115° C. and a zero acid number. GRS–1004 is a copolymer of 75 parts of butadiene and 25 parts of styrene.

The adhesive was prepared by masterbatching the rubbers and all powdered materials on a cold 2-roll rubber mill. The terpene resin was added to the masterbatch in a Baker-Perkins heavy duty internal mixer (or mogul) while heat was applied, with the phenol-aldehyde resin added after the temperature reached 150° C. When the power requirements of the mogul increased sharply, the adhesive was cooled and mixed with the hexane.

The calculated cohesive energy density of the rubber resin components of this adhesive is about 67 calories per cubic centimeter. Viscosity of the adhesive when coated on inert film backing is about 10 million poises so that this is properly characterized as a firm-type rubber resin adhesive.

Rolls of tape of this example made with the 6-mil plasticized vinyl resin film, after being held overnight at −23° C., were easily unwound from roll form without offsetting of adhesive and had adequate adhesiveness at this temperature to adhere firmly to smooth surfaces. The adhesion at −18° C. was tested by rolling a strip of the tape into full contact with a polished steel plate, both the tape and plate having first been held overnight at this temperature. A force of 20 ounces was required to strip the ¾-inch tape back from the plate at an angle of essentially 180 degrees by moving the plate relative to the free end of the tape at a constant speed of 90 inches per minute. The adhesion to steel of the tape at ordinary room temperature was 40 ounces per ¾-inch width. Both values are excellent.

The tape was wrapped half-lapped on #16 copper wire formed into a pigtail splice of over 1½ inches in length. After 60 days in a full-flow air circulating oven at 90° C. and then being cooled to room temperature, the splice was fully flexible. The tape thus passes the Weston Splice Test, which is used by Underwriters' Laboratories as a screening test for approval for use of insulating tape under conditions of exposure to 80° C.

Electrical loss factor (dissipation factor times dielectric constant) tested on a General Radio Capacitance Bridge according to standard ASTM test procedure at 90° C., 50% relative humidity, and 60 cycles per second was 0.67. This low value is indicative of good electrical insulation.

When tested on the Instron Tensile Tester at a rate of 12 inches per minute, a stress of 875 pounds per square inch elongated the tape 50% at 23° C. That is, the tape had a modulus at 50% elongation of 875 p.s.i. At −18° C., the modulus at 50% elongation was 4100 p.s.i. In each case, the cross-sectional area of the adhesive was disregarded in calculating the modulus.

A one-inch wide strip of this tape was stretched by hand over 200% before breaking. Another one-inch wide strip was hand-stretched about 50% and released, and it recovered all but 2% of the elongation within 20 seconds.

Example 2

| | Parts by weight |
|---|---|
| Vinyl chloride—vinyl acetate copolymer (97:3) | 100 |
| Polyester A | 46.5 |
| Polyester B | 6.5 |
| Poly-alpha-methylstyrene | 5 |
| Di-2-ethylhexyl phthalate | 4 |
| Dibasic lead phosphite | 2.5 |
| Basic silicate of white lead | 1 |
| Mineral oil | 1 |
| Carbon black | 1.25 |

These materials were mixed for 30 minutes in a Sprout-Waldron ribbon blender. The mixture was then fused in a Banbury mixer, held until a temperature of 150° C. was attained, and then fed into a Z calender with rolls maintained at 150° C. to calender it into a film 7.5 mils in thickness.

This plasticized vinyl film tested at −20° C. had a modulus at 50% elongation of 3750 pounds per square inch. Elongation at break at −20° C. was 225%. The ratio of the brittleness at −20° C. to that at 0° was 1.54. Weight loss after 24 hours at 113° C. in activated charcoal was 2.9%.

The plasticized film was primed with a 9% solids solution of 250 parts by weight of a 52% solids latex of butadiene-acrylonitrile copolymer, 300 parts of cumarone indene resin, and 50 parts of para-tertiary-butyl-phenol formaldehyde resin ("Super Beckacite 1003"). The solvent was 20% heptane and 80% methyl ethyl ketone. Over the dried primer coating was applied the solution of firm-type rubber resin adhesive of Example 1 to a dried coating thickness of about 1.2 mils to provide a pressure-sensitive insulating tape.

Rolls of this tape, after being held for several hours at −20° C., were readily unwound at this temperature without breaking and without splitting or offsetting of adhesive. When measured by ASTM D 1000–48T, adhesion to steel of the tape was 25 ounces per inch of width at 23° C.; and when the steel plate and tape were individually precooled to −12° C., adhesion to steel was 30 ounces per inch; and after accelerated aging by exposure to 65° C. for 7 days, adhesion to steel at 23° C. was 21 ounces per inch.

A one-inch wide strip of this adhesive tape was hand-stretched about 175% without breaking. Another strip, hand-stretched 50% and released, recovered all but 3% of the elongation within 45 seconds.

The ASTM electrical loss factor for this tape at 90° C. was 0.35. The tape also passed the Weston Splice Test at a test temperature of 87° C.

*Example 3*

| | Parts by weight |
|---|---|
| Polyvinyl chloride | 100 |
| Polyester A | 45 |
| Non-acylated polyester | 10 |
| Di-2-ethylhexyl phthalate | 5 |
| Dibasic lead phthalate | 2 |
| Stearic acid | 0.5 |
| Carbon black | 1 |

The non-acylated resinous polyester (which was obtained from Rohm & Haas Co. under the trade designation "Paraplex G–25" about 5 years period to the filing of our application S.N. 174,650) was understood to be a polyester of essentially equi-molar proportions of 1,2-propylene glycol and sebacic acid. Its number average molecular weight, calculated from intrinsic viscosity in methyl ethyl ketone as reported by the manufacturer, was about 8000. Its number average molecular weight determined by the vapor pressure method referred to hereinabove was about 5300 and its acid number was about 1.5.

These materials were masticated in the same manner as in Example 1 and calendered to a 6-mil thickness. This film had a modulus at 50% elongation measured at −18° C. of 3900 pounds per square inch and an elongation at break at −18° C. of 180%. Weight loss after 24 hours at 113° C. in activated charcoal was 4.0%.

The presence of the non-polymeric plasticizer, di-2-ethylhexyl phthalate, in small proportion did not noticeably affect the qualities sought in this invention, as evidenced by tests performed as in Example 1 on a tape having a 6-mil film backing provided with the same primer and adhesive coating as in Example 1. After first being held overnight at −23° C., a roll of ¾-inch wide tape was readily unwound without offsetting of adhesive. Adhesion to steel at −18° C. was 12 ounces per ¾-inch width tested at 90 inches per minute as in Example 1. The value was 29 ounces at 23° C. Loss factor at 90° C. was 0.434. The tape also passed the Weston Splice Test at 90° C.

*Example 4*

The primary constituent of the plasticizer in the vinyl composition of this example was a polyester of essentially equi-molar proportions of sebacic acid and 1,2-propylene glycol terminated with 13.1% lauric acid to a number average molecular weight of about 1100. Its acid number was 1.5. The vinyl composition was identical to that of Example 1 except that the Polyester A was replaced by a mixture of 57 parts of this polyester, 4 parts of dioctyl sebacate and 5 parts of poly-alpha-methylstyrene. Modulus at 50% elongation was 2370 and elongation at break was 235%, both measured at −20° C.

Rolls of pressure-sensitive adhesive insulating tape were prepared from a film of this plasticized vinyl composition as in Example 1, except that the film was primed with an aqueous dispersion of substantially equal parts of natural rubber latex and butadiene-acrylonitrile latex, including about 8 parts wetting agent per 100 parts rubber. The tape had good performance over the range of −20° C. to 87° C. Adhesion to steel at −12° C. (ASTM Method D 1000–48T) was 46 ounces per inch; at 23° C. was 21 ounces per inch; and at 23° C. after aging for 7 days at 65° C., was 20 ounces per inch.

*Example 5*

A liquid polyester of 2,2,4-trimethylpentane diol-1,3, adipic acid and butyric acid having a molecular weight of about 570, an acid number of 3.3 and containing an average of a little more than 4.0 ester groups per molecule was employed in the following composition:

| | Parts by weight |
|---|---|
| Vinyl resin of Example 1 | 100 |
| Liquid polyester | 50 |
| Dibasic lead phosphite | 1.5 |
| Mineral oil | 1.0 |
| Carbon black | 1.5 |

A 7.5-mil film of this plasticized vinyl composition had the following properties:

| Test Temperature | Modulus at 50% elongation, p.s.i. | Modulus at break, p.s.i. | Elongation at break, percent |
|---|---|---|---|
| 23° C. | 1,630 | 4,080 | 350 |
| 0° C. | 3,060 | 4,720 | 285 |
| −20° C. | 5,000 | 5,120 | 165 |

For this film, the ratio of the brittleness at −20° C. (modulus at break divided by elongation at break) to the brittleness at 0° C. was 1.87. Weight loss after 24 hours at 113° C. in activated charcoal was 10.5%.

Pressure-sensitive adhesive tape prepared using this plasticized vinyl film as the backing with coatings of the primer of Example 4 and of the adhesive composition of Example 1 exhibited adhesion to steel (ASTM D 1000–48T) of 32 ounces per inch of width at 23° C. A roll of the tape, after several hours at −14° C., was unwound at this temperature without splitting or offsetting of the adhesive although its resistance to unwind was somewhat high. Its elasticity and retractility were adequate, and the tape had good thumb appeal, although it did not adhere to steel at this temperature as aggressively as might be desired.

*Example 6*

A polyester plasticizer which has demonstrated utility in the manufacture of vinyl insulating tape of our invention for use at temperatures as low as −20° C. without sacrifice of high temperature qualities was prepared as follows. Six mols of n-octoic acid were condensed with one mol of dipentaerythritol at 205° C. over a period of eight hours using zinc chloride as catalyst and toluene as water entrainer. The water of condensation was removed continuously during the reaction. The following day, acetic anhydride was added to neutralize, and the mixture was reacted another four hours at 205° C., with the removal of a small amount of water, after which the solvent was evaporated at 50 mm. of mercury and 175° C. Acid number of the polyester product was about 2. Because of the ether group in the skeletal backbone of this plasticizer, electrical insulating properties of pressure-sensitive adhesive tape made with vinyl resin film plasticized with this liquid polyester are not as good as where the polyester plasticizer consists exclusively of ester groups and carbon-to-carbon skeletal chains which are substantially free from ethylenic unsaturation. However, where only a few ether groups are present, as in this case, or where the degree of ethylenic unsaturation is minor, the electrical insulation values are adequate for all but the most exacting uses, particularly where other elements of the novel tape of our invention are preferred elements.

A similar liquid polyester, "Hercoflex 707," is the polyester of one mol of dipentaerythritrol and 6 mols of a mixture of n-octanoic acid, butyric acid and caprylic acid to provide an average of about 7 carbon atoms per terminating chain. Its molecular weight is approximately 786. With 60 parts of this plasticizer substituted for Polyester A in the vinyl composition of Example 1, the film had a modulus at 50% elongation of 4080 p.s.i. and elongation at break of 190%, both measured at —20° C. Weight loss in activated charcoal after 24 hours at 113° C. was 2.2%. When only 50 parts of this plasticizer were used, the —20° C., modulus at 50% elongation was 4390 p.s.i., and elongation at break was 195%. A roll of tape prepared with this plasticized vinyl film as the backing and with the primary of Example 4 and the firm-type rubber resin adhesive of Example 1 performed well at —20° C. and passed the Weston Splice Test at 87° C. ASTM adhesion to steel was 49 ounces per inch at —12° C., 24 ounces per inch at 23° C., and 20 ounces per inch at 23° C. after aging 7 days at 65° C.

It is surprising that the liquid polyesters of Examples 5 and 6 can be used as the sole plasticizer for vinyl resin in the film backing of stretchable and retractable pressure-sensitive adhesive tape, since one would expect liquid plasticizer, when used in sufficiently large amount, to migrate into the adhesive coating to render it unduly soft and pasty. Accordingly, we believe that we are the first ever to prepare stretchable and retractable pressure-sensitive adhesive tape of good quality using plasticized vinyl resin film wherein the major proportion of the plasticizer is a liquid of less than about 1000 molecular weight, and especially where the liquid makes up all or substantially all of the plasticizer. By stretchable and retractable is meant that the tape is originally stretchable in widths of about one inch by simple hand pulling to an extent of at least 50% at normal room temperatures and is substantially completely retractable from an elongation of 30%, as described in the Oace et al. Reissue Patent No. 23,843.

The use of plasticizing material, at least a major proportion of which is a liquid polyester such as the polyester of Examples 5 and 6, permits economy in the preparation of the plasticized vinyl film backings due to ease and speed of mixing. Moreover, lower processing temperatures are permitted, with less loss of volatile materials, and the resultant film is particularly smooth and good looking. These advantages are realized not only when these liquid polyesters are used as sole plasticizers as in Examples 5 and 6, but also by employing these liquid polyesters in conjunction with viscous plasticizer resins or polymers. For example, in conjunction with Polyesters A or B in a total amount of about 45–75 parts of plasticizer per 100 parts of vinyl polymer, an all-weather pressure-sensitive adhesive tape may be formulated in the practice of this invention. Preferably these liquid polyesters should ordinarily not be used in amounts exceeding about ⅔ the amount of the vinyl polymer, or the adhesive coating may be softened to an undesirable extent.

When it is not important to attain good performance at sub-freezing temperatures, these liquid polyesters may be employed as the sole plasticizer in lesser amounts, but at least about ⅓ of the vinyl polymer. Alternatively, these liquid polyesters may be employed in conjunction with minor but still substantial amounts of viscous plasticizer resins, as long as the total plasticizing material is at least about ⅓ the weight of the vinyl polymer. In either case, greater latitude in selection of adhesive is permitted as to firmness and as to cohesive energy density. An exemplary film backing was prepared of 100 parts of the vinyl copolymer of Example 1, 30 parts of the polyester of Example 6 ("Hercoflex 707") and 15 parts of the nonmigratory viscous polyester resin of adipic acid and 1,2-propylene glycol terminated with about 22.5% of mixed fatty acids, mainly stearic acid, having a number average molecular weight of about 1250 and an acid number of less than 2. The plasticized vinyl composition also contained 1.5 parts of dibasic lead phosphite and 1.0 parts of lubricant. Modulus at 50% elongation was 1570 p.s.i. and the modulus at break was 3870 p.s.i. at an elongation of 330%, all measured at 23° C.

An unprimed 7.5-mil film of this vinyl composition was provided with a coating of the pressure-sensitive adhesive composition of Example 1 of Oace et al. Re 23,843 modified by the addition of 10 parts of carbon black in place of the yellow pigment. The resultant tape exhibited an adhesion to steel (ASTM D 1000–48T) at 23° C. of 26 ounces per inch. A roll of the tape, after being held several hours at —14° C. could be unwound with care, except for some offsetting of adhesive, and had slight thumb appeal and adhesion to steel at that temperature. It could be stretched at —14° C. in one inch widths by hand pulling with considerable effort at least 50% before breaking. However, this tape performs well at temperatures above freezing (0° C.), e.g. at temperatures at which stretchable vinyl tapes were normally used prior to our invention.

Another stretchable and retractable vinyl insulating tape having good utility for use at temperatures above freezing was prepared using a 5.9-mil film of the following composition: 100 parts of the vinyl copolymer of Example 1, 35 parts of the liquid polyester of Example 6 ("Hercoflex 707") and 25 parts of the nonmigrating viscous polyester resin of adipic acid and 1,2 propylene glycol terminated with about 0.5% fatty acid (mainly palmitic), having a number average molecular weight of about 3300 and an acid number of less than 2. The plasticized vinyl composition also contained 1.5 parts of dibasic lead phosphite and 1.0 part of lubricant. Modulus at 50% elongation was 2235 p.s.i. and was 4130 p.s.i. at a break elongation of 290%, both measurements at 23° C.

The unprimed film was coated with the pressures sensitive adhesive of Example 1 of this specification to provide a tape having an adhesion to steel of 48 ounces per inch. A roll of the tape held for several hours at —14° C. was very difficult to unwind without breaking and exhibited considerable offsetting of adhesive. It had fairly good thumb appeal but only slight adhesion to steel and was too brittle to be stretched more than 10 or 20% at that temperature. However, as above indicated, this tape has good utility for use at temperatures above freezing; and it is a unique and desirable replacement for the stretchable vinyl tape known prior to this invention.

*Example 7*

Four mols (808 grams) of sebacic acid, 3.75 mols (285 grams) of 1,2-propylene glycol and 2 mols of a mixture of 80 parts lauryl alcohol and 20 parts n-tetradecyl alcohol were mixed and azeotropically distilled in toluene at 205–210° C. for 6 hours, at which time 159 cc. of water had been removed and the acid number was 25. The next day the batch was reheated another 8 hours with the removal of an additional 15 cc. of water, reaching an acid number of 2.8. The following day one gram of zinc chloride was added, and the toluene was removed at 20 mm. of mercury and 140° C. The pressure was then reduced to 4 mm. with heating to 200–217° C. for 4 hours, 26 grams of distillate being removed. The product polyester was a waxy-appearing crystalline semi-solid having an acid number of 4.0. Its number average molecular weight was about 1260.

Sixty parts of this alcohol-terminated polyester were used in place of Polyester A to prepare a plasticized vinyl film as in Example 1. This film had a modulus at 50% elongation of 3230 p.s.i. and an elongation at break of 270%, both measured at −20° C. Rolls of pressure-sensitive adhesive tape made with this film using the firm-type rubber resin adhesive of Example 1 demonstrated utility at sub-freezing temperatures as well as good high temperature properties.

Since the process of making a polyester is easier to control when using an acid terminant than when using an alcohol terminant and it is also easier to obtain uniform products, we prefer to employ acid terminants.

*Example 8*

The plasticized vinyl film of Example 2 was primed as in Example 4 and then coated with a volatile petroleum hydrocarbon solution of a silicone pressure-sensitive adhesive composition consisting approximately of 50 parts of a copolymer, as a resinous tackifier, composed of $(CH_3)_3SiO_{.5}$ units and $SiO_2$ units having a general average of about 1.2 methyl units per silicon atom, 50 parts of an elastomeric dimethylsiloxane polymer having a viscosity in excess of 100,000 poises at 25° C., and about 2.0 parts of benzoyl peroxide as curing agent. Cohesive energy density of this pressure-sensitive adhesive calculated from its rubber resin components was 53 calories per cubic centimeter. Viscosity of the adhesive coated on an inert backing rises to about 5 million poises after heating to reinforce the adhesive coating by reaction with the peroxide.

Before reaction with the peroxide, dried coatings of this pressure-sensitive adhesive composition have a viscosity below one million poises. However, even in the absence of the peroxide, the viscosity increases upon heating, though at a slower rate, to above 2 million poises so that this may be characterized as a firm-type rubber resin adhesive.

ASTM steel adhesion of this pressure-sensitive adhesive vinyl insulating tape was 39 ounces per inch at −12° C., 20 ounces per inch at 23° C., and 18 ounces per inch at 23° C. after accelerated aging at 65° C. for 7 days.

A one-inch wide strip of the tape, elongated 50% by hand, retracted substantially to its original length within a minute at room temperature.

The tape passed the Weston Splice Test at a test temperature of 113° C. Its loss factor at 90° C. was 0.25.

*Example 9*

A 7.5-mil film of the plasticized vinyl composition of Example 2 was primed as in Example 4 and then coated with a solution of a firm-type rubber resin adhesive, to provide a pressure-sensitive adhesive vinyl insulating tape. The rubber resin adhesive had the formulation:

|  | Parts by weight |
|---|---|
| Cis-1,4-polyisoprene | 50 |
| Cis-1,4-polybutadiene | 50 |
| Pentaerithritol ester of hydrogenated rosin | 100 |
| Zinc oxide | 10 |
| Carbon black | 35 |
| Di-tert-amyl hydroquinone | 2 |
| Phenol-aldehyde resin of Example 1 | 12 |
| Hexane | 500 |

The calculated cohesive energy density of the rubber resin components of this adhesive is about 73 calories per cc. Viscosity of the adhesive when coated on inert backing is about 1½ million poises.

ASTM adhesion to steel of this vinyl insulating tape was 17 ounces per inch at −12° C., 25 ounces per inch at 23° C., and 21 ounces per inch at 23° C. after accelerated aging at 65° C. for 7 days. Somewhat better adhesion is achieved if the tackifier resin of this adhesive is replaced by that used in the rubber resin adhesive of Example 1.

The tape was readily unwound from roll form after long exposure to −20° C., showed good retractility, and passed the Weston Splice Test at 87° C.

*Example 10*

A pressure-sensitive adhesive tape was prepared using a 7.5-mil film backing of the plasticized vinyl composition of Example 2 primed as in Example 4 and coated with this firm-type rubber resin adhesive composition:

|  | Parts by weight |
|---|---|
| Cis-1,4-polyisoprene | 50 |
| Butadiene-styrene (75:25) copolymer | 50 |
| Polymerized terpene resin ("Piccolite S–115") | 100 |
| Phenol-aldehyde resin of Example 1 | 18 |
| Carbon black | 35 |
| Zinc oxide | 10 |
| Di-tert-amyl hydroquinone | 2 |
| Hexane | 500 |

The calculated cohesive energy density of the rubber resin components of this adhesive is about 67 calories per cc. Viscosity on an inert backing is about 8 million poises.

ASTM adhesion to steel of this pressure-sensitive adhesive tape was 25 ounces per inch at −12° C., 30 ounces per inch at 23° C.

Rolls of this tape were readily unwound without delamination at −20° C. and had good high temperature properties for use as electrical insulating tape.

*Example 11*

The pressure-sensitive adhesive tape of this example was the same as in Example 10 except in being coated with the following firm-type rubber resin adhesive composition containing a total of 85 parts tackifier resin per 100 parts of rubber.

|  | Parts by weight |
|---|---|
| Crude smoked sheet | 100 |
| Polymerized terpene resin ("Piccolite S–115") | 60 |
| Wood rosin | 20 |
| Zinc resinate | 5 |
| Phenol-aldehyde resin of Example 1 | 20 |
| Titanium dioxide | 20 |
| Zinc oxide | 20 |
| Di-tert-amyl hydroquinone | 2 |
| Hexane | 500 |

Calculated cohesive energy density of the rubber resin components of this adhesive is about 69.5 calories per cc. Its viscosity when coated on inert film backing is over 10 million poises.

ASTM steel adhesion of this pressure-sensitive adhesive vinyl insulating tape was 60 ounces per inch at −12° C. and 67 ounces per inch at 23° C.

Rolls of this tape were readily unwound at −20° C. and also had good high temperature properties for electrical insulating uses.

As may be seen from the foregoing examples, the best performance at very cold temperatures is achieved in tapes wherein the plasticized film backing has, when tested at −20° C., a modulus at 50% elongation of about 4400 p.s.i. or less and an elongation at break of about 175% or more. The tape described in the second paragraph of Example 6, the film backing of which has at −20° C. a modulus at 50% elongation of 4390 p.s.i. and an elongation at break of 195%, is illustrative; note also the tape of Example 3. On the other hand, the tape of Example 5, which was made with a plasticized film backing having at −20° C. a somewhat higher modulus at 50% elongation and lower elongation at break, does not equal the performance of tapes of the other examples at very cold temperatures, although it still may be put to subfreezing use.

The pressure-sensitive adhesive tapes of our invention have uses other than as electrical insulation. For example, our all-weather tape is an effective replacement for lacquer and wax on the running surfaces of skis or toboggans. Because it remains flexible and resilient at cold temperatures, it resists fracture and tearing away to a much greater extent than do vinyl insulating tapes of the prior art.

This application is a continuation of our copending application S.N. 174,650, filed February 7, 1962, now abandoned, as a continuation-in-part of our application S.N. 112,745, filed May 18, 1961, now abandoned, which is a continuation-in-part of our earlier application S.N. 794,225, filed February 19, 1959, now abandoned.

What is claimed is:

1. A pressure-sensitive adhesive tape capable of being wound upon itself in roll form and of being readily unwound at any ambient temperature including temperatures as low as −20° C. without splitting or offsetting of the adhesive and then wrapped around splices and wires, and having sufficient elasticity, retractility and adhesion at any such temperature to remain tightly and snugly in place, while providing effective electrical insulation of the splices and wires over at least the range of −20° C. to 87° C., said adhesive tape comprising: (1) a soft and pliable film backing consisting essentially of a stable blend of (a) 100 parts by weight of a film-forming polymer of monomer comprising at least about 90% vinyl chloride and (b) about 45–75 parts of plasticizer, the primary constituent of which is a soft viscous polyester compatible with the vinyl polymer in said amount and stable against substantial exudation from the vinyl polymer, said polyester having a number average molecular weight of about 750–2500 and containing hydrocarbon chains between ester groups, and further containing terminating hydrocarbon chains, said chains having an average length providing in said plasticized film an elongation at break of at least 100% at −20° C.; and (2) a normally tacky and pressure-sensitive adhesive coating of a firm-type rubber resin composition firmly united to one face of said backing, the rubber resin components of said adhesive composition having a cohesive energy density of less than 75 calories per cubic centimeter; said plasticizer in said film backing being in permanent equilibrium with said pressure-sensitive adhesive coating so as to avoid pastiness or loss of tack of the adhesive coating and diminution of the flexibility of the film backing; and said adhesive tape being originally stretchable in widths of about one inch by simple hand pulling to an extent of at least 100% at room temperature and being substantially completely retractable from an elongation of 50% in seconds or minutes.

2. A pressure-sensitive adhesive tape capable of being wound upon itself in roll form and of being readily unwound at any ambient temperature including temperatures as low as −20° C. without breaking and without splitting or offsetting of the adhesive and then wrapped around splices and wires, and having sufficient elasticity, retractility and adhesion at any such temperature to remain tightly and snugly in place, while providing effective electrical insulation of the splices and wires over at least the range of −20° C. to 87° C., said adhesive tape comprising: (1) a soft and pliable film backing consisting essentially of a stable blend of (a) 100 parts by weight of a polymer of vinyl chloride and up to about 10% vinyl acetate and (b) about 45–75 parts of plasticizer, the primary constituent of which is a soft viscous polyester compatible with the vinyl polymer in said amount and is stable against substantial exudation from the vinyl polymer, said polyester having a number average molecular weight of about 750–2500 and containing alkylene chains between ester groups, and further containing terminating acyl chains, said alkylene and acyl chains having an average length providing in said plasticized film an elongation at break of at least 125% at −20° C.; and (2) a normally tacky and pressure-sensitive adhesive coating of a firm-type rubber resin adhesive composition united to one face of said backing, the rubber resin components of said adhesive composition having a cohesive energy density of less than 75 calories per cubic centimeter and said adhesive composition having a viscosity at 23° C. of at least about two million poises; said plasticizer in said film backing being in permanent equilibrium with said pressure-sensitive adhesive coating so as to avoid pastiness or loss of tack of the adhesive coating and diminution of the flexibility of the film backing; and said adhesive tape being originally stretchable in widths of about one inch by simple hand pulling to an extent of at least 100% at room temperature and being substantially completely retractable from an elongation of 50% in seconds or minutes.

3. A pressure-sensitive adhesive tape capable of being wound upon itself in roll form and of being readily unwound at any ambient temperature including temperatures as low as −20° C. without delamination or offsetting of the adhesive and wrapped around splices and wires, and having sufficient elasticity, retractility and adhesion at any such low temperature to remain tightly and snugly in place, while providing effective electrical insulation of the splices and wires over at least the range of −20° C. to 87° C., said adhesive tape comprising: (1) a soft and pliable film backing consisting essentially of a stable blend of (a) 100 parts by weight of a film-forming polymer of monomer comprising at least about 90% vinyl chloride and (b) about 45–75 parts of plasticizer, the primary constituent of which is a soft viscous acylated polyester of glycol and dibasic carboxylic acid compatible with the vinyl polymer in said amount and stable against substantial exudation from the vinyl polymer, said polyester having a number average molecular weight of 750–2500 and an acid number of less than 3, the skeletal backbone of which polyester consists of ester groups connected by alkylene chains including an average of 4 to 7 carbon atoms and is terminated by acyl chains containing 2 to 18 carbon atoms and on the average at least 8 carbon atoms, the average number of carbon atoms in individual alkylene and acyl chains being 5 to 9, said film backing having at −20° C. a modulus at 50% elongation of less than 5300 p.s.i. and an elongation at break of at least 125%; and (2) a normally tacky and pressure-sensitive adhesive coating of a firm-type rubber resin composition firmly united to one face of said backing, the rubber resin components of said adhesive composition having a cohesive energy density of less than 75 calories per cubic centimeter and said adhesive composition having a viscosity at 23° C. of at least about two million poises; said plasticizer in said film backing being in permanent equilibrium with said pressure-sensitive adhesive coating so as to avoid pastiness or loss of tack of the adhesive coating and diminution of the flexibility of the film backing; and said adhesive tape being originally stretchable in widths of about one inch by simple hand pulling to an extent of at least 100% at room temperature and being substantially completely retractable from an elongation of 50% in seconds or minutes.

4. A pressure-sensitive adhesive tape capable of being wound upon itself in roll form and of then being unwound at temperatures as low as −20° C. without delamination or offsetting of the adhesive and wrapped around splices and wires, and having sufficient elasticity, retractility and adhesion at such low temperatures to remain tightly and snugly in place, while providing effective electrical insulation of the splices and wires over the range of −20° C. to 87° C., said adhesive tape comprising: (1) a film backing consisting essentially of a stable blend of (a) 100 parts by weight of a polymer of vinyl chloride and up to about 10% vinyl acetate and (b) 45–75 parts of plasticizer, the primary constituent of which is acylated polyester of glycol and dibasic carboxylic acid, at least 90 mol percent of said glycol being selected from at least one of 1,2-propylene glycol, 1,4-butane diol and 1,6-hexane diol, but not more than 65 mol percent of the glycol being 1,2-propylene glycol, and at least 90 mol percent of said dibasic acid being selected from at least one of the group of saturated aliphatic dibasic acids having alkylene chains of 3 to 8 carbon atoms, said polyester being terminated by acyl radicals containing 2 to 18 carbon atoms and on the average at least 8 carbon atoms and having a number average molecular weight of 1000–2500, said plasticizer having an acid number of not more than 3; and (2) a normally tacky and pressure-sensitive adhesive coating united and firmly bonded to one face of said film backing, said adhesive coating comprising a homogeneous blend of (a) 40–60 parts by weight of natural rubber, (b) correspondingly 60–40 parts of butadiene-styrene synthetic rubber, (c) 80–115 parts of thermoplastic terpene resin having low acid number and having a melting point of at least 60° C., and (d) 3–16 parts of a campatible, oil-soluble, heat-reactive phenol-aldehyde resin.

5. A pressure-sensitive adhesive tape capable of being wound upon itself in roll form and of then being unwound at temperatures as low as −20° C. without delamination or offsetting of the adhesive and wrapped around splices and wires, and having sufficient elasticity, retractility and adhesion at such low temperatures to remain tightly and snugly in place, while providing effective electrical insulation of the splices and wires over the range of −20° C. to 87° C., said adhesive tape comprising: (1) a film backing consisting essentially of a stable blend of (a) 100 parts by weight of a polymer of vinyl chloride and up to about 10% vinyl acetate and (b) 45–75 parts of plasticizer, the primary constituent of which is acylated polyester of glycol and dibasic carboxylic acid, at least 90 mol percent of said glycol being selected from at least one of 1,2-propylene glycol, 1,4-butane diol and 1,6-hexane diol, but not more than 65 mol percent of the glycol being 1,2-propylene glycol, and at least 90 mol percent of said dibasic acid being selected from a least one of the group of saturated aliphatic dibasic acids having alkylene chains of 3 to 8 carbon atoms, said polyester being terminated by acyl radicals containing 2 to 18 carbon atoms and on the average at least 8 carbon atoms and having a number average molecular weight of 1000–2500, said plasticizer having an acid number of not more than 3; and (2) an adhesive primer coating on the inside face of the film backing adapted to increase the anchorage of the adhesive coating; and (3) a normally tacky and pressure-sensitive adhesive coating united and firmly bonded to said primer coating, said adhesive coating comprising a homogeneous blend of (a) 40–60 parts by weight of natural rubber, (b) correspondingly 60–40 parts of butadiene-styrene synthetic rubber, (c) 80–115 parts of a pure-hydrocarbon thermoplastic terpene resin having low acid number and having a melting point of at least 60° C., and (d) 3–16 parts of a compatible, oil-soluble, heat-reactive phenol-aldehyde resin.

6. A pressure-sensitive adhesive tape capable of being wound upon itself in roll form and of being readily unwound at any ambient temperature including temperatures as low as −20° C. without splitting or offsetting of the adhesive and then wrapped around splices and wires, and having sufficient elasticity, retractility and adhesion at any such temperature to remain tightly and snugly in place, while providing effective electrical insulation of the splices and wires over at least the range of −20° C. to 87° C., said adhesive tape comprising: (1) a soft and pliable film backing consisting essentially of a stable blend of (a) 100 parts by weight of a film-forming polymer of monomer comprising at least about 90% vinyl chloride and (b) about 45–75 parts of plasticizer, the primary constituent of which is a polyester compatible with the vinyl polymer in said amount and stable against substantial exudation from the vinyl polymer, said polyester having a number average molecular weight of about 750–1500 and containing alkylene chains between ester groups, and further containing terminating hydrocarbon chains, said chains having an average length providing in said plasticized film an elongation at break of at least 100% at −20° C.; and (2) a normally tacky and pressure-sensitive adhesive coating of a firm-type rubber resin composition firmly united to one face of said backing, the rubber resin components of said adhesive composition having a cohesive energy density of less than 75 calories per cubic centimeter; said plasticizer in said film backing being in permanent equilibrium with said pressure-sensitive adhesive coating so as to avoid pastiness or loss of tack of the adhesive coating and diminution of the flexibility of the film backing; and said adhesive tape being originally stretchable in widths of about one inch by simple hand pulling to an extent of at least 100% at room temperature and being substantially completely retractable from an elongation of 50% in seconds or minutes.

7. An all-weather pressure-sensitive adhesive tape capable of being wound upon itself in roll form and of being readily unwound at ambient temperatures ranging from sub-freezing temperatures up to 50° C. without splitting or offsetting of the adhesive, and which is stretchable, flexible, retractable and can be wrapped at such temperatures around splices and wires and has sufficient elasticity, retractility and adhesion to remain tightly and snugly in place, said adhesive tape comprising (1) a water-insoluble and hydrocarbon-oil-insoluble film backing comprising a stable blend of (a) a film-forming polymer of monomers including at least a major proportion of vinyl chloride, and (b) substantially nonvolatile plasticizing material therefor in an amount within the range of about 45 to 75 parts per 100 parts of said polymer providing a plasticized film backing having at −20° C. a modulus at 50% elongation of less than about 4400 p.s.i. and an elongation at break of at least about 175%, and further having a brittleness which at −20° C. is not more than twice the value at 0° C.; and (2) a coating of firm-type pressure-sensitive adhesive firmly united to one face of said plasticized film backing and comprising an elastomeric rubber material and a compatible resinous tackifier therefor, the combined rubbery and resinous ingredients of said adhesive having a low cohesive energy density; said plasticizing material in said film backing being in permanent equilibrium with said pressure-sensitive adhesive coating so as to avoid pastiness or loss of tack of the adhesive coating while still maintaining good flexibility and retractility of said film backing over the range of sub-freezing temperatures to 50° C.; said adhesive tape being originally stretchable in widths of about one inch by simple hand pulling to an extent of at least 100% at normal room temperatures and being substantially completely retractable from an elongation of 50% in seconds or minutes.

8. An all-weather pressure-sensitive adhesive tape capable of being wound upon itself in roll form and of being readily unwound at ambient temperatures ranging from sub-freezing temperatures up to 50° C. without splitting or offsetting of the adhesive, and which is stretchable, flexible, retractable and can be wrapped at such temperatures around splices and wires and has sufficient elasticity, retractility and adhesion to remain tightly and snugly in place, while providing effective electrical insulation of the splices and wires over a temperature range from −20° to 87° C., said adhesive tape comprising (1) a water-insoluble and hydrocarbon-oil-insoluble, soft and pliable film backing of high dielectric strength comprising a stable blend of (a) a film-forming polymer of monomers including at least a major proportion of vinyl chloride, and (b) plasticizing material having a number average molecular weight within the range of 500 to 2500 and in an amount within the range of about 45 to 75 parts per 100 parts of said polymer providing a plasticized film backing having at —20° C. a modulus at 50% elongation of less than 5300 p.s.i., and of such character that said plasticized film backing has a volatility of less than about 10%, measured at 113° C. by the activated charcoal method; and (2) a coating of firm-type pressure-sensitive adhesive firmly united to one face of said plasticized film backing and comprising an elastomeric rubber material and a compatible resinous tackifier therefor, the combined rubbery and resinous ingredients of said adhesive having a low cohesive energy density; said plasticizing material in said film backing being in permanent equilibrium with said pressure-sensitive adhesive coating so as to avoid pastiness or loss of tack of the adhesive coating while still maintaining good flexibility and retractility of said film backing over the range of sub-freezing temperatures to 50° C; said adhesive tape being originally stretchable in widths of about one inch by simple hand pulling to an extent of at least 100% at normal room temperatures and being substantially completely retractable from an elongation of 50% in seconds or minutes.

9. An all-weather pressure-sensitive adhesive tape capable of being wound upon itself in roll form and of being readily unwound at ambient temperatures ranging from sub-freezing temperatures up to 50° C., without splitting or offsetting of the adhesive, and which is stretchable, flexible, retractable and can be wrapped at such temperatures around splices and wires and has sufficient elasticity, retractility and adhesion to remain tightly and snugly in place, while providing effective electrical insulation of the splices and wires over a temperature range from —20° C. to 87° C., said adhesive tape comprising (1) a water-insoluble and hydrocarbon-oil-insoluble, soft and pliable film backing of high dielectric strength comprising a stable blend of (a) a film-forming polymer of monomers including at least a major proportion of vinyl chloride, and (b) plasticizing material having a number average molecular weight above 500 but less than about 2000 and being present in an amount within the range of about 45 to 75 parts per 100 parts of said polymer to provide a plasticized film backing having at —20° C. a modulus at 50% elongation of less than 5300 p.s.i. and an elongation at break of at least 100% and further having a brittleness which at —20° C. is not more than twice the value at 0° C., and the plasticizing material being of such character that said plasticized film backing has a volatility of less than 10%, measured at 113° C. by the activated charcoal method; and (2) a coating of firm-type pressure-sensitive adhesive firmly united to one face of said plasticized film backing and comprising an elastomeric rubber material and a compatible resinous tackifier therefor, the combined rubbery and resinous ingredients of said adhesive being resistant to softening by the plasticizing material, the cohesive energy density being less than 75 calories per cubic centimeter; said plasticizing material in said film backing being in permanent equilibrium with said pressure-sensitive adhesive coating so as to avoid pastiness or loss of tack of the adhesive coating while still maintaining good flexibility and retractility of said film backing over the range of sub-freezing temperatures to 50° C.; said adhesive tape being originally stretchable in widths of about one inch by simple hand pulling to an extent of at least 100% at normal room temperatures and being substantially completely retractable from an elongation of 50% in seconds or minutes.

10. An all-weather pressure-sensitive adhesive tape capable of being wound upon itself in roll form and of being readily unwound at ambient temperatures ranging from sub-freezing temperatures up to 50° C. without splitting or offsetting of the adhesive, and which is stretchable, flexible, retractable and can be wrapped at such temperatures around splices and wires and has sufficient elasticity, retractility and adhesion to remain tightly and snugly in place, while providing effective electrical insulation of the splices and wires over a temperature range from —20° to 87° C., said adhesive tape comprising (1) a water-insoluble and hydrocarbon-oil-insoluble, soft and pliable film backing of high dielectric strength comprising a stable blend of (a) 100 parts by weight of a film-forming polymer of monomers including at least a major proportion of vinyl chloride, and (b) about 45–75 parts of substantially nonvolatile plasticizing material, the primary constituent of which is a polyester having a number average molecular weight of about 500–2500, and where the number average molecular weight is below 750, said plasticizing material having substantially no molecules of less than about 500 molecular weight, the skeletal backbone of said primary constituent comprising ester groups connected by hydrocarbon chains including an average of about 4 to 7 carbon atoms and being terminated by hydrocarbon chains containing 2 to 18 carbon atoms, the average number of carbon atoms in individual connecting and terminating chains being about 5 to 9; and (2) a coating of firm-type pressure-sensitive adhesive firmly united to one face of said plasticized film backing and comprising an elastomeric rubber material and a compatible resinous tackifier therefor, the combined rubbery and resinous ingredients of said adhesive having a cohesive energy density of less than 75 calories per cubic centimeter; said plasticizing material in said film backing being in permanent equilibrium with said pressure-sensitive adhesive coating so as to avoid pastiness or loss of tack of the adhesive coating while still maintaining good flexibility and retractility of said film backing over the range of sub-freezing temperatures to 50° C.; said adhesive tape being originally stretchable in widths of about one inch by simple hand pulling to an extent of at least 100% at normal room temperatures and being substantially completely retractable from an elongation of 50% in seconds or minutes.

11. An all-weather presure-sensitive adhesive tape wound upon itself in roll form and capable of being readily unwound at ambient temperatures ranging from sub-freezing temperatures up to 50° C. without splitting or offsetting of the adhesive, and which is stretchable, flexible, retractable and can be wrapped at such temperatures around splices and wires and has sufficient elasticity, retractility and adhesion to remain tightly and snugly in place, while providing effective electrical insulation of the splices and wires over a temperature range —20° C. to 87° C., said adhesive tape comprising (1) a water-insoluble and hydrocarbon-oil-insoluble, soft and pliable film backing of high dielectric strength comprising a stable blend of (a) 100 parts by weight of a film-forming polymer of monomers comprising at least about 90% vinyl chloride, and (b) about 45–75 parts of substantially non-volatile plasticizing material, the primary constituent of which is a polyester having a number average molecular weight of about 750–2500, the skeletal backbone of which polyester comprises ester groups connected by alkylene chains including an average of 4 to 7 carbon atoms and is terminated by acyl chains containing 2 to 18 carbon atoms, the average number of carbon atoms in individual connecting and terminating chains being about 5 to 9; (2) an adhesive primer coating on the inner face of the film backing adapted to increase the anchorage of the adhesive coating; and (3) a coating of firm-type pressure-sensitive adhesive composition firmly united to said plasticized film backing over said primer coating and comprising an elastomeric rubber material and a compatible resinous tackifier therefor, said adhesive composition having a viscosity at 23° C. of at least about two million poises and the combined rubbery and resinous ingredients of said adhesive composition having a cohesive energy density of less than 75 calories per cubic centimeter; said plasticizing material in said film backing being in permanent equilibrium with said pressure-sensitive adhesive coating so as to avoid pastiness or loss of tack of the adhesive coating while still maintaining good flexibility and retractility of said film backing over the range of sub-freezing temperatures to 50° C.; said adhesive tape being originally stretchable in widths of about one inch by simple hand pulling to an extent of at least 100% at normal room temperatures and being substantially completely retractable from an elongation of 50% in seconds or minutes.

12. A pressure-sensitive adhesive tape capable of being wound upon itself in roll form and of being readily unwound at ambient temperatures without splitting or offsetting of the adhesive and then wrapped around splices and wires, and having sufficient elasticity, retractility and adhesion to remain tightly and snugly in place, said adhesive tape comprising: (1) a water-insoluble and hydrocarbon-oil-insoluble film backing comprising a stable blend of (a) a film-forming polymer of monomers including at least a major proportion of vinyl chloride, and (b) substantially nonvolatile plasticizing material therefor in an amount within the range of about ⅓ to ¾ the amount of said polymer and comprising at least a major proportion, and not more than about ⅔ the amount of said vinyl polymer, of a liquid polyester compatible with said vinyl polymer in said amount and stable against substantial exudation from the vinyl polymer, said polyester having an open-chain molecular structure containing an average of at least 4 ester groups per molecule, substantially all of which molecules have a molecular weight within the range of about 500 to 1000; and (2) a normally tacky and pressure-sensitive rubber-resin type adhesive coating firmly united to one face of said plasticized film backing; said plasticizing material in said film backing being in permanent equilibrium with said pressure-sensitive adhesive coating so as to avoid pastiness or loss of tack of the adhesive coating and to avoid substantial diminution of the flexibility of said film backing; and said adhesive tape being originally stretchable in widths of about one inch by simple hand pulling to an extent of at least 50% at normal room temperatures, and being substantially completely retractable from an elongation of 30%.

13. A pressure-sensitive adhesive tape wound upon itself in roll form and capable of being readily unwound at ambient temperatures without delamination or offsetting of the adhesive and then wrapped around splices and wires, and having sufficient elasticity, retractility and adhesion to remain tightly and snugly in place, said adhesive tape comprising: (1) a water-insoluble and hydrocarbon-oil-insoluble film backing comprising a stable blend of (a) a film-forming polymer of monomers including at least a major proportion of vinyl chloride, and (b) substantially nonvolatile plasticizing material therefor in an amount within the range of about ⅓ to ¾ the amount of said polymer and comprising at least a major proportion, and not more than about ⅔ the amount of said vinyl polymer, of a liquid polyester compatible with the vinyl polymer in said amount and stable against substantial exudation from the vinyl polymer, said polyester having an open-chain molecular structure containing an average of at least 4 ester groups per molecule, substantially all of which molecules have a molecular weight within the range of about 500 to 1000, said ester groups being connected by hydrocarbon chains including an average of about 4 to 8 carbon atoms and being terminated by hydrocarbon chains containing 2 to 18 carbon atoms, the average number of carbon atoms in individual connecting and terminating chains being about 5 to 9; (2) an adhesive primer coating on the inner face of the film backing adapted to increase the anchorage of the adhesive coating; and (3) a normally tacky and pressure-sensitive rubber-resin type adhesive coating firmly united to said backing over said primer coating; said plasticizing material in said film backing being in permanent equilibrium with said pressure-sensitive adhesive coating so as to avoid pastiness or loss of tack of the adhesive coating and to avoid substantial diminution of the flexibility of said film backing; and said adhesive tape being originally stretchable in widths of about one inch by simple hand pulling to an extent of at least 50% at normal room temperatures, and being substantially completely retractable from an elongation of 30%.

14. A pressure-sensitive adhesive tape capable of being wound upon itself in roll form and of being readily unwound at ambient temperatures without delamination or offsetting of the adhesive and then wrapped around splices and wires, and having sufficient elasticity, retractility and adhesion to remain tightly and snugly in place, said adhesive tape comprising: (1) a water-insoluble and hydrocarbon-oil-insoluble film backing comprising a stable blend of (a) a film-forming polymer of monomer comprising at least 90% vinyl chloride, and (b) substantially nonvolatile plasticizing material therefor in an amount within the range of about ⅓ to ¾ the amount of said polymer and comprising a major proportion, and not more than about ⅔ the amount of said vinyl polymer, of a liquid polyester compatible with the vinyl polymer in said amount and stable against substantial exudation from the vinyl polymer, said polyester having an open-chain molecular structure containing an average of at least 4 ester groups per molecule, substantially all of which molecules have a molecular weight within the range of about 500 to 1000, said ester groups being connected by alkylene chains including an average of about 4 to 8 carbon atoms and being terminated by acyl chains containing 2 to 18 carbon atoms, the average number of carbon atoms in individual connecting and terminating chains being about 5 to 9, and a minor proportion of a nonmigrating viscous plasticizer resin, and (2) a coating of normally tacky and pressure-sensitive rubber-resin type adhesive firmly united to one face of said backing; said plasticizer in said film backing being in permanent equilibrium with said pressure-sensitive adhesive coating so as to avoid pastiness or loss of tack of the adhesive coating and to avoid substantial diminution of the flexibility of said film backing; and said adhesive tape bing originally stretchable in widths of about one inch by simple hand pulling to an extent of at least 50% at normal room temperatures, and being substantially completely retractable from elongations of 30%.

15. An all-weather pressure-sensitive adhesive tape capable of being wound upon itself in roll form and of being readily unwound at ambient temperatures ranging from sub-freezing temperatures up to 50° C. without splitting or offsetting of the adhesive, and which is stretchable, flexible, retractable and can be wrapped at such temperatures around splices and wires and has sufficient elasticity, retractility and adhesion to remain tightly and snugly in place, while providing effective electrical insulation of the splices and wires over a temperature range from −20° to 87° C., said adhesive tape comprising (1) a water-insoluble and hydrocarbon-oil-insoluble, soft and pliable film backing of high dielectric strength comprising a stable blend of (a) a film-forming polymer of monomers including at least a major proportion of vinyl chloride, and (b) substantially nonvolatile plasticizing material in an amount within the range of about 45 to 75 parts per 100 parts of said polymer and comprising at least a major proportion, and not more than about ⅔ the amount of said vinyl polymer, of a liquid polyester compatible with said vinyl polymer in said amount and stable against substantial exudation from the vinyl polymer, said polyester having an open-chain molecular structure containing an average of at least 4 ester groups per molecule, substantially all of which molecules have a molecular weight within the range of about 500 to 1000, the total plasticizing material being such that said plasticized film backing has at −20° C. a modulus at 50% elongation of less than 5300 p.s.i.; and (2) a coating of firm-type pressure-sensitive adhesive firmly united to one face of said plasticized film backing and comprising an elastomeric rubber material and a compatible resinous tackifier therefor, the combined rubbery and resinous ingredients of said adhesive having a low cohesive energy density; said plasticizing material in said film backing being in permanent equilibrium with said pressure-sensitive adhesive coating so as to avoid pastiness or loss of tack of the adhesive coating while still maintaining good flexibility and retractility of said film backing over the range of sub-freezing temperatures to 50° C.; said adhesive tape being originally stretchable in widths of about one inch by simple hand pulling to an extent of at least 100% at normal room temperatures and being substantially completely retractable from an elongation of 50% in seconds or minutes.

16. A pressure-sensitive adhesive tape capable of being wound upon itself in roll form and of being readily unwound at ambient temperatures without splitting or offsetting of the adhesive and then wrapped around splices and wires, and having sufficient elasticity, retractility and adhesion to remain tightly and snugly in place, said adhesive tape comprising (1) a water-insoluble and hydrocarbon-oil-insoluble film backing comprising a stable blend of (a) a film-forming polymer of monomers including at least a major proportion of vinyl chloride, and (b) substantially nonvolatile plasticizing material therefor in an amount within the range of about ⅓ to about ⅔ the amount of said polymer and consisting essentially of a liquid polyester compatible with said vinyl polymer in said amount and stable against substantial exudation from the vinyl polymer, said polyester having an open-chain molecular structure containing an average of at least 4 ester groups per molecule, substantially all of which molecules have a molecular weight within the range of about 500 to 1000; and (2) a normally tacky and pressure-sensitive rubber-resin type adhesive coating firmly united to one face of said plasticized film backing; said plasticizing material in said film backing being in permanent equilibrium with said pressure-sensitive adhesive coating so as to avoid pastiness or loss of tack of the adhesive coating and to avoid substantial diminution of the flexibility of said film backing; and said adhesive tape being originally stretchable in widths of about one inch by simple hand pulling to an extent of at least 50% at normal room temperatures, and being substantially completely retractable from an elongation of 30%.

17. The pressure-sensitive adhesive tape of claim 16 wherein said liquid polyester is essentially pentaerythritol ester comprising dipentaerythritol ester.

References Cited in the file of this patent

UNITED STATES PATENTS

| | | |
|---|---|---|
| Re. 23,843 | Oace et al. | June 29, 1954 |
| 2,332,265 | Schmidt | Oct. 19, 1943 |
| 2,617,779 | Griffith et al. | Nov. 11, 1952 |
| 2,708,192 | Joesting et al. | May 10, 1955 |
| 2,734,503 | Doyle | Feb. 14, 1956 |
| 2,815,354 | Wilkinson et al. | Dec. 3, 1957 |
| 2,877,141 | Shelley et al. | Mar. 10, 1959 |

FOREIGN PATENTS

| | | |
|---|---|---|
| 150,069 | Australia | Feb. 16, 1953 |
| 231,029 | Australia | Oct. 2, 1958 |

OTHER REFERENCES

Koroly: "Polymeric Plasticizers," Industrial and Engineering Chemistry, pages 1060–1063, May 1953.